H. M. PUTNAM.
Improvement in Bench-Hooks.

No. 116,220.　　　　　　　　　　　　Patented June 20, 1871.

Witnesses:  
John Becker  
Wm H. R. Smith

Inventor:  
H. M. Putnam  
per Munn  
Attorneys.

UNITED STATES PATENT OFFICE.

HENRY MARSHALL PUTNAM, OF FITCHBURG, MASSACHUSETTS.

IMPROVEMENT IN BENCH-HOOKS.

Specification forming part of Letters Patent No. 116,220, dated June 20, 1871.

*To all whom it may concern:*

Be it known that I, HENRY MARSHALL PUTNAM, of Fitchburg, in the county of Worcester and State of Massachusetts, have invented a new and useful Improvement in Bench-Hook; and I do hereby declare that the following is a full, clear, and exact description thereof, which will enable others skilled in the art to make and use the same, reference being had to the accompanying drawing forming part of this specification.

This invention relates to a new and useful improvement in bench-hooks for carpenters' or joiners' use, as well as for cabinet-makers and wood-workers in general; and consists in making the hook adjustable by means of a shank and socket, arranged and operating as hereinafter described.

Figure 1:
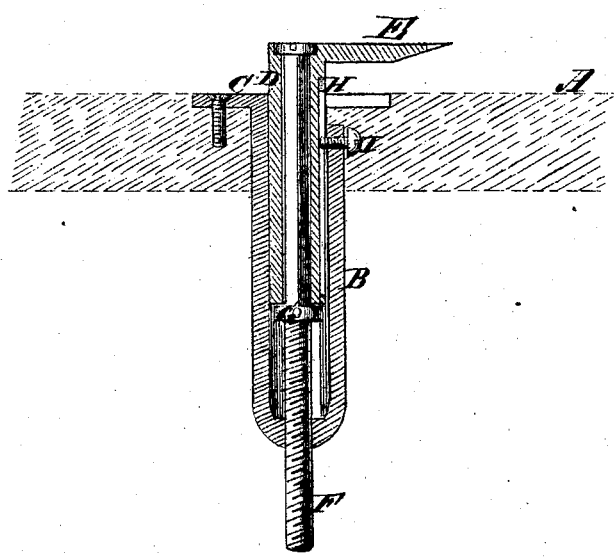
Figure 2:
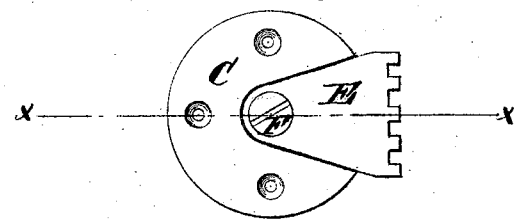

In the accompanying drawing, Figure 1 represents a vertical section of the arrangement as attached to the bench, the section being taken on the line $x\ x$ of Fig. 2. Fig. 2 is a top view.

Similar letters of reference indicate corresponding parts.

A represents a bench. B is a metallic socket, upon the top end of which is a flange, C, with screw-holes, by means of which the socket is fastened in the top of the bench, as seen in the drawing, the top of the flange being flush with the surface of the bench. D is a tubular shank of the hook. E is the hook. F is a screw, which passes through the lower shank and through the lower end of the socket, where it engages with a screw-thread as with a nut. The head of the screw is countersunk in the top of the shank, and has a nick so that it may be turned by a screw-driver up or down for adjusting the hook. G is a collar on the screw, upon which the tubular shank of the hook rests, by means of which the hook is raised when the screw is turned up. The shank is prevented from turning round, when the hook is raised or lowered, by means of the groove H in the shank and a screw, I, in the socket, as seen in Fig. 1. By this means the hook may be raised and lowered and kept in the desired position with the utmost precision.

This is a most perfect and complete adjustable bench-hook, and its advantages over anything of the kind in use must be obvious to all who are acquainted with the subject.

Having thus described my invention, I claim as new and desire to secure by Letters Patent—

The socket B, tubular shank D provided with hook E, and screws F I, combined and arranged to operate substantially as and for the purposes described.

HENRY MARSHALL PUTNAM.

Witnesses:
GEORGE W. CANN,
T. K. WARE.